(12) United States Patent
Fujita et al.

(10) Patent No.: US 6,763,813 B2
(45) Date of Patent: Jul. 20, 2004

(54) CURRENT PASSING DEVICE OF EGR VALVE APPARATUS

(75) Inventors: Youichi Fujita, Tokyo (JP); Sotsuo Miyoshi, Tokyo (JP); Satoru Hasegawa, Tokyo (JP); Katsunori Takai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/258,802
(22) PCT Filed: Feb. 27, 2001
(86) PCT No.: PCT/JP01/01466
§ 371 (c)(1),
(2), (4) Date: Oct. 28, 2002
(87) PCT Pub. No.: WO02/069473
PCT Pub. Date: Sep. 6, 2002

(65) Prior Publication Data
US 2003/0089350 A1 May 15, 2003

(51) Int. Cl.[7] ............................. H02K 5/10; F02M 25/07
(52) U.S. Cl. .............. 123/568.21; 310/239; 251/129.13
(58) Field of Search ....................... 123/568.21, 568.23, 123/568.24; 251/129.11, 129.12, 129.13; 310/238, 239

(56) References Cited

U.S. PATENT DOCUMENTS 6,357,425 B2     3/2002  Fujita et al.
6,488,259 B1 *  12/2002  Fujita et al. ........... 251/129.11
2003/0111929 A1 *  6/2003  Hong et al. ................ 310/239

* cited by examiner

Primary Examiner—Mahmoud Gimie
Assistant Examiner—Arnold Castro
(74) Attorney, Agent, or Firm—Sughrue Mion, PLLC

(57) ABSTRACT

Particle trapping means for trapping worn particles of a commutator is provided in a power source side case mounted on a motor case of a DC motor.

11 Claims, 9 Drawing Sheets

(a)

(b)

CURRENT PASSING DEVICE OF EGR VALVE APPARATUS

TECHNICAL FIELD

The present invention relates to a current passing device of an EGR (exhaust gas recirculation) valve apparatus for constituting a recirculation system of, for example, an exhaust gas.

BACKGROUND ART

This kind of EGR valve apparatus in the prior art used a stepping motor as a valve opening/closing unit, but it has become to use a DC motor in place of the stepping motor in order to comply with increasing resolution, response and output power at the time of adjusting the opening of a valve.

FIG. 1 is a cross sectional view to show the current passing device of an EGR valve apparatus in the prior art. FIG. 2 is an enlarged cross sectional view of a relevant part of the device in FIG. 1. FIG. 3(a) is a perspective view to partially show a brush holding pipe portion in FIG. 2. FIG. 3(b) is an end view of FIG. 3(a).

In FIG. 1, a reference numeral 1 denotes a DC motor that is a driving unit (torque generating unit) of a valve for opening and closing an exhaust gas passage; a reference numeral 2 denotes a motor case thereof; a reference numeral 3 denotes a rotor rotatably supported in the motor case 2 via bearings 4, 5 and the rotor 3 has a screw hole 3a which is made to penetrate through at its axial center portion; a reference numeral 6 denotes a magnet mounted on the outer periphery of the rotor 3; and a reference numeral 7 denotes a stator core which is surrounding the outer periphery of the magnet 6 and a predetermined gap is formed between the stator core 7 and the magnet 6.

A reference numeral 8 denotes a coil that is arranged on both sides in the axial direction of the stator core 7 and constitutes a stator; a reference numeral 9 denotes a motor shaft that is a valve driving shaft and the motor shaft 9 is formed of a screw shaft and is screwed into the screw hole 3a of the above described rotor 3, thereby being moved in the axial direction by the rotation of the rotor 3.

A reference numeral 10 denotes a valve shaft abutting member that is integrally formed with the motor shaft 9 and a protruding end (right end in FIG. 1) of the valve shaft abutting member 10 abuts an end portion of a valve shaft (not shown) having the above mentioned valve at the tip thereof to make the valve shaft follow the movement in the axial direction of the above mentioned motor shaft 9 to thereby open and close the above described valve.

A reference numeral 11 denotes a cover member which is mounted on an end surface of the motor case 2 in a side of the valve shaft abutting member 10; a reference numeral 12 denotes a spring retaining member mounted on the protruding end side of the valve shaft abutting member 10; a reference numeral 13 denotes a valve urging spring which is mounted between the spring retaining member 12 and the above mentioned cover member 11 and the spring 13 urges the valve at the tip of the valve shaft via the valve shaft abutting member 10 in the direction to which the valve opens.

A reference numeral 14 denotes a commutator that rotates integrally with the rotor 3 and has an axial hole 14a at the center thereof.

A reference numeral 15 denotes a power source side case which is mounted on an opening end portion on a side of the commutator 14 of the motor case 2, and the power source side case 15 is made of one piece molded synthetic resin to constitute a main body of the current passing device of the DC motor 1 and is integral with a sensor built in portion 16 in which a position sensor (not shown) for detecting a degree of opening of the above mentioned valve is built and an input/output connector portion 17 in which a connector terminal is built.

In FIG. 1 and FIG. 2, a reference numeral 18 denotes a brush holding pipe portion integrally molded with a wall portion opposite to the commutator 14 of the power source side case 15; reference numerals 19 denote a plurality of axial slits which are made at the brush holding pipe portion 18; reference numerals 20 denote a plurality of brushes for passing current that are slidably inserted into the above mentioned brush holding pipe portion 18 and the brushes 20 are made of carbon particles and copper particles; reference numerals 21 denote a plurality of lead wires for passing current that are connected to the above mentioned brushes 20 and the lead wires 21 are extended from the slit 19 of the above mentioned brush holding pipe portion 18 and are connected to the connector terminal of the above mentioned input/output connector portion 17; reference numerals 22 denote a plurality of brush pressing springs which are received in the above mentioned brush holding pipe portion 18 and an urging force of the spring 22 puts the tip of the brush 20 into sliding contact with the above mentioned commutator 14. Herein, reference symbols 20a in FIG. 2 denote the worn particles of the brush 20.

Hereinafter, mounting the above mentioned brush 20 and mounting the power source side case 15 on the motor case 2 will be described.

First, when the brush 20 is mounted, in the first place the spring 22 is inserted into and received in the brush holding pipe portion 18 and then the brush 20 is inserted into the brush holding pipe portion 18 and when the brush 20 is inserted the lead wire 21 is slidably fitted in the slit 19, thereby mounting the brush 20 is finished. After the brush 20 is mounted, the power source side case 15 is fitted in and fixed to the opening end portion of the motor case 2 while the tip of the brush 20 is pressed onto the commutator 14, thereby mounting the power source side case 15 is finished.

Next, the operation of the device will be described.

When a direct current is supplied to the brush 20, the direct current is passed through the coil 8 after rectification by the commutator 14, so that an interaction between a magnetic field generated by the coil 8 and the magnetic field of the magnet 6 generates a rotational torque to the rotor 3. When the rotor 3 is rotated by the rotational torque, the motor shaft 9 screwed in the screw hole 3a of the rotor 3 is forced by the screws thereby to be moved linearly in the axial direction.

Herein, in the case where the motor shaft 9 is moved in the right direction in FIG. 1, the valve shaft abutting member 10 is pushed in a direction against the urging force of the spring 13 by the motor shaft 9 to open the valve via the valve shaft connected to the valve shaft abutting member 10. On the other hand, in the case where the motor shaft 9 is moved in the left direction in FIG. 1, the valve shaft abutting member 10 is made to follow the motor shaft 9 by the urging force of the spring 13 to close the valve via the valve shaft connected to the valve shaft abutting member 10.

Since the current passing device of the EGR valve apparatus in the prior art is constituted in the manner described above, it presents the following problems: the self-heating of the brush 20, which is caused when current is passed through the brush 20, and frictional heat, which is generated when the brush 20 is pressed onto the commutator 14, increase the ambient temperature of the brush holding pipe portion 18 to thermally deform the brush holding pipe portion 18 in the direction sandwiching the brush 20 as shown by a broken line in FIG. 3(b), to impair the sliding ability of the brush 20 by the thermal deformation, which results in poor contact between the brush 20 and the commutator 14. Thus, it is thought that a clearance between the brush holding pipe portion 18 and the brush 20 is increased in anticipation of the thermal deformation of the brush holding pipe portion 18, but in this case, there is presented another problem that the brush 20 has a too much allowance and hence causes noises.

Further, there is presented the following problem: since the above mentioned brush holding pipe portion 18 has a simple constitution in which it has the slit 19 for simply guiding the lead wire 21, when the power source side case 15 is mounted on the motor case 2 while the brush 20 is being pressed in a state where the spring 22 and the brush 20 are sequentially inserted into and set in the brush holding pipe portion 18, the brush 20 is jumped out of the brush holding pipe portion 18 by the resilience of the spring 22 to thereby impair the working property for mounting.

Still further, there are presented the following problems: when the DC motor 1 is started to operate, the brush 20 being in contact with the commutator 14 which is integrally rotated with the rotor 3 produces worn particles (carbon particles+copper particles) 20a and because no countermeasures are made against the worn particles 20a, the above mentioned worn particles 20a are suspended in the air and attached to the commutator 14 to thereby reduce the insulating ability of the commutator 14, or the above mentioned worn particles 20a enter a portion where the motor shaft 9 is screwed into the rotor 3 to thereby impair the movability in the axial direction of the motor shaft 9 when the rotor 3 is rotated, or still further, the above mentioned worn particles 20a enter inside of the sensor to thereby interfere with the function of the sensor.

The present invention has been made to solve the problems described above. It is an object of the present invention to provide a current passing device of an EGR valve apparatus that can prevent the thermal deformation of the brush holding pipe portion and can stably ensure the sliding ability of the brush.

Further, it is another object of the present invention to provide a current passing device of an EGR valve apparatus that can prevent a brush from being jumping out of the brush holding pipe portion by the resilience of the spring when a power source side case is mounted on a motor case to thereby improve working property for mounting.

Still further, it is further object of the present invention to provide a current passing device of an EGR valve apparatus that can prevent a reduction in the insulating ability of a commutator, a deterioration in the movability of a motor shaft, and a detriment to the function of the sensor all of those are caused by the worn particles of a brush.

DISCLOSURE OF THE INVENTION

A current passing device of an EGR valve apparatus in accordance with the present invention includes: a DC motor that has a commutator rotating integrally with a rotor and drives a motor shaft in an axial direction in connection with the rotation of the rotor to thereby open and close a valve; a power source side case that is provided with a sensor for detecting a position of the valve and an input/output connector portion and is mounted and set in a motor case of the DC motor; a brush that is mounted in the power source side case and is put into sliding contact with the commutator; and urging means for urging the brush in a direction that presses the brush onto the commutator, and it is characterized in that particle trapping means for trapping the worn particles of the brush is provided in the power source side case.

According to this constitution, the particle trapping means provided in the power source side case traps the worn particles of the brush and hence can prevent the worn particles from attaching to the surface of the commutator or entering a portion where the motor shaft is screwed into the rotor and entering the inside of the sensor, which results in producing an effect of preventing the deterioration in insulating ability of the commutator, deterioration in movability in the axial direction of the motor shaft, and detriment to the function of the sensor all of those are caused by the worn particles of the brush.

In the current passing device of an EGR valve apparatus in accordance with the present invention, the particle trapping means includes a particle attracting space formed by a rib for trapping particles that is provided in the power source side case.

According to this constitution, it becomes possible to effectively attract the worn particles of the brush in the particle attracting space and thus to produce an effect of improving the performance of trapping the worn particles.

In the current passing device of an EGR valve apparatus in accordance with the present invention, a web like rib is formed on the inside wall surface of the power source side case to form a plurality of particle attracting spaces.

According to this constitution, it becomes possible to produce an effect of further improving the performance of trapping the worn particles of the brush by the plurality of particle attracting spaces. Further, the web like rib can produce an effect of increasing the strength of the power source side case.

In the current passing device of an EGR valve apparatus in accordance with the present invention, the surface of the rib and the bottom surface of the particle attracting space are made rough.

According to this constitution, since the surface of the rib and the bottom surface of the particle attracting space are made rough, they can produce an effect of further improving the performance of attracting and trapping the worn particles of the brush.

A current passing device of an EGR valve apparatus in accordance with the present invention includes: a DC motor that has a commutator rotating integrally with a rotor and drives a motor shaft in an axial direction in connection with the rotation of the rotor to thereby open and close a valve; a power source side case that is provided with a sensor for detecting a position of the valve and an input/output connector portion and is mounted and set in a motor case of the DC motor; a brush holding pipe portion that is mounted on the power source side case; a brush that is slidably inserted into the brush holding pipe portion and is put into sliding contact with the commutator; and urging means that is built in the brush holding pipe portion for urging the brush in a direction that presses the brush onto the commutator, characterized in that rib to prevent thermal deformation is provided on the brush holding pipe portion.

According to this constitution, it becomes possible to prevent the thermal deformation of the brush holding pipe portion and thus to produce an effect of ensuring the stable slidability of the brush.

In the current passing device of an EGR valve apparatus in accordance with the present invention, rib to prevent thermal deformation is formed continuously integrally with a rib for trapping particles that is provided in the power source side case to form a particle attracting space.

According to this constitution, it becomes possible to surely prevent the thermal deformation of the brush holding pipe portion and to form the thermal deformation preventing rib integrally with the particle trapping rib, which results in producing an effect of easily forming the ribs.

A current passing device of an EGR valve apparatus in accordance with the present invention includes a brush falling out preventing means to prevent the brush which is slidably inserted into a brush holding portion and is urged in the direction that puts the brush into sliding contact with a commutator, from falling out of the brush holding pipe portion.

According to this constitution, it becomes possible to prevent the brush from jumping out of the brush holding pipe portion when the power source side case is mounted on the motor case, which results in producing an effect of improving workability in mounting the power source side case.

In the current passing device of an EGR valve apparatus in accordance with the present invention, a pressing piece portion which presses a lead wire connected to the brush on a tip side of the brush holding pipe portion, is formed on a portion of the sensor component as the brush falling out preventing means, on a portion of a sensor component.

According to this constitution, it becomes possible to prevent the brush from jumping out of the brush holding pipe portion by pressing the lead wire of the brush that is inserted into the brush holding pipe portion and is urged in the direction that presses the brush into sliding contact with the commutator by means of the pressing piece portion on the side of the sensor. For this reason, it becomes possible to easily insert and set the brush into the brush holding pipe portion and to easily mount the power source side case on the motor case, which results in producing an effect of improving workability. Further, since the above mentioned pressing piece portion presses the lead wire on the tip side of the brush holding pipe portion, it becomes possible to produce an effect of ensuring a sliding stroke responsive to the wear of the brush.

In the current passing device of an EGR valve apparatus in accordance with the present invention, a lead wire engaging protrusion is formed on a tip of the brush holding pipe portion having a slit in which a lead wire connected to the brush is fitted, and that extends in a direction that blocks the slit as the brush falling out preventing means.

According to this constitution, only by forming the lead wire engaging protrusion on the tip of the brush holding pipe portion, it becomes possible to produce an effect of preventing the brush from jumping out of the brush holding pipe portion and of ensuring a sliding stroke responsive to the wear of the brush.

In the current passing device of an EGR valve apparatus in accordance with the present invention, when the brush is inserted into the brush holding pipe portion, the lead wire connected to the brush is fitted in the slit of the brush holding pipe portion and then a portion of the tip of the brush holding pipe portion is bent in the direction that blocks the above mentioned slit to form lead wire engaging protrusion.

According to this constitution, when the lead wire is fitted in the slit of the brush holding pipe portion, it becomes possible to produce an effect of easily fitting the lead wire in the slit without the interference of the lead wire engaging protrusion and of preventing the brush from jumping out of the brush holding pipe portion.

A current passing device of an EGR valve apparatus in accordance with the present invention includes a filter to prevent entry of worn particles of the brush which is disposed between the commutator and a front end face of the sensor portion mounted on the power source side case.

According to this constitution, it becomes possible to prevent the worn particles of the brush from entering a portion where a motor shaft is screwed into a rotor and the inside of a sensor, which results in producing an effect of normally ensuring the movability of the motor shaft and the function of the sensor.

BEST MODE FOR CARRYING OUT THE INVENTION

In order to describe the present invention in more detail, the best modes for carrying out the present invention will be hereinafter described with reference to the accompanying drawings.

Preferred Embodiment 1

Figure 1:
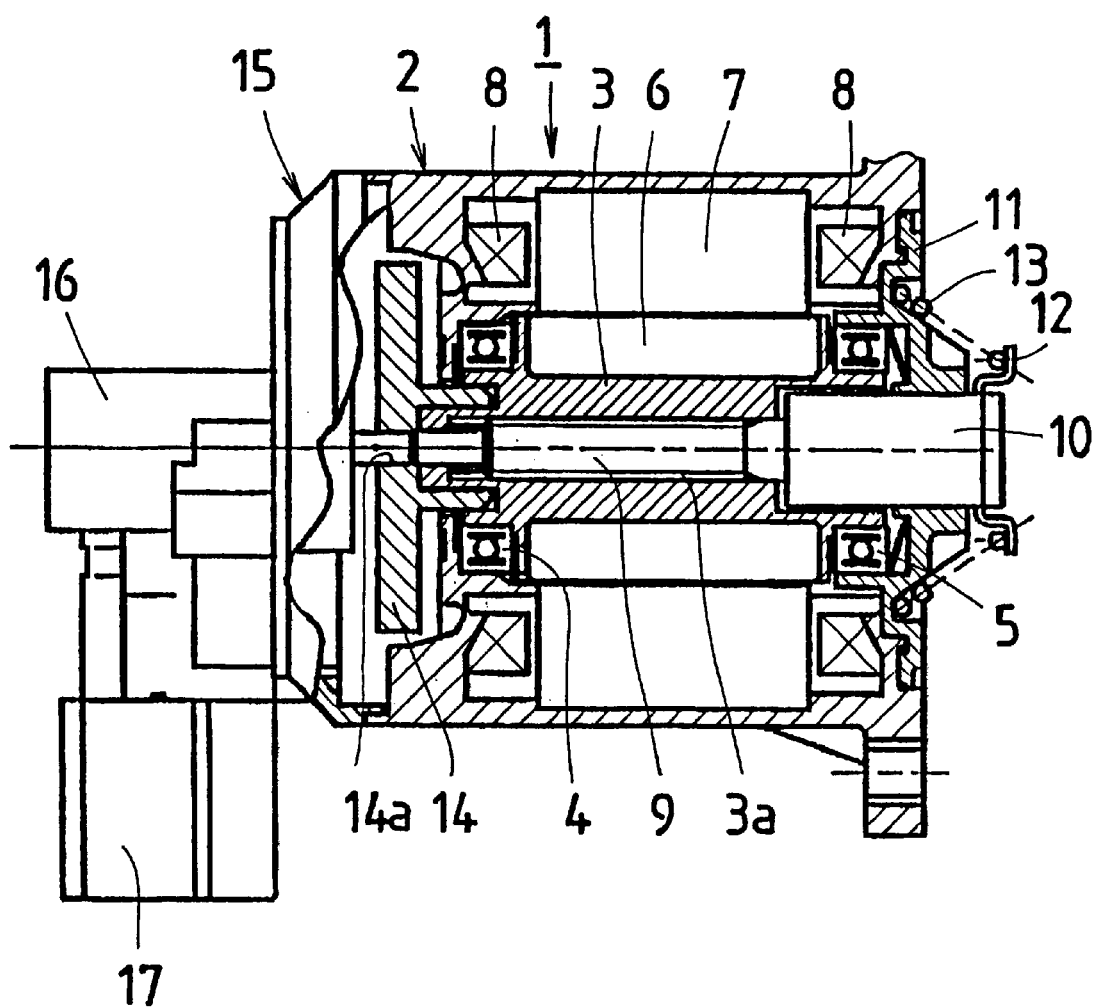
FIG. 1 is a cross sectional view to show a current passing device of an EGR valve apparatus in the prior art.
Figure 2:
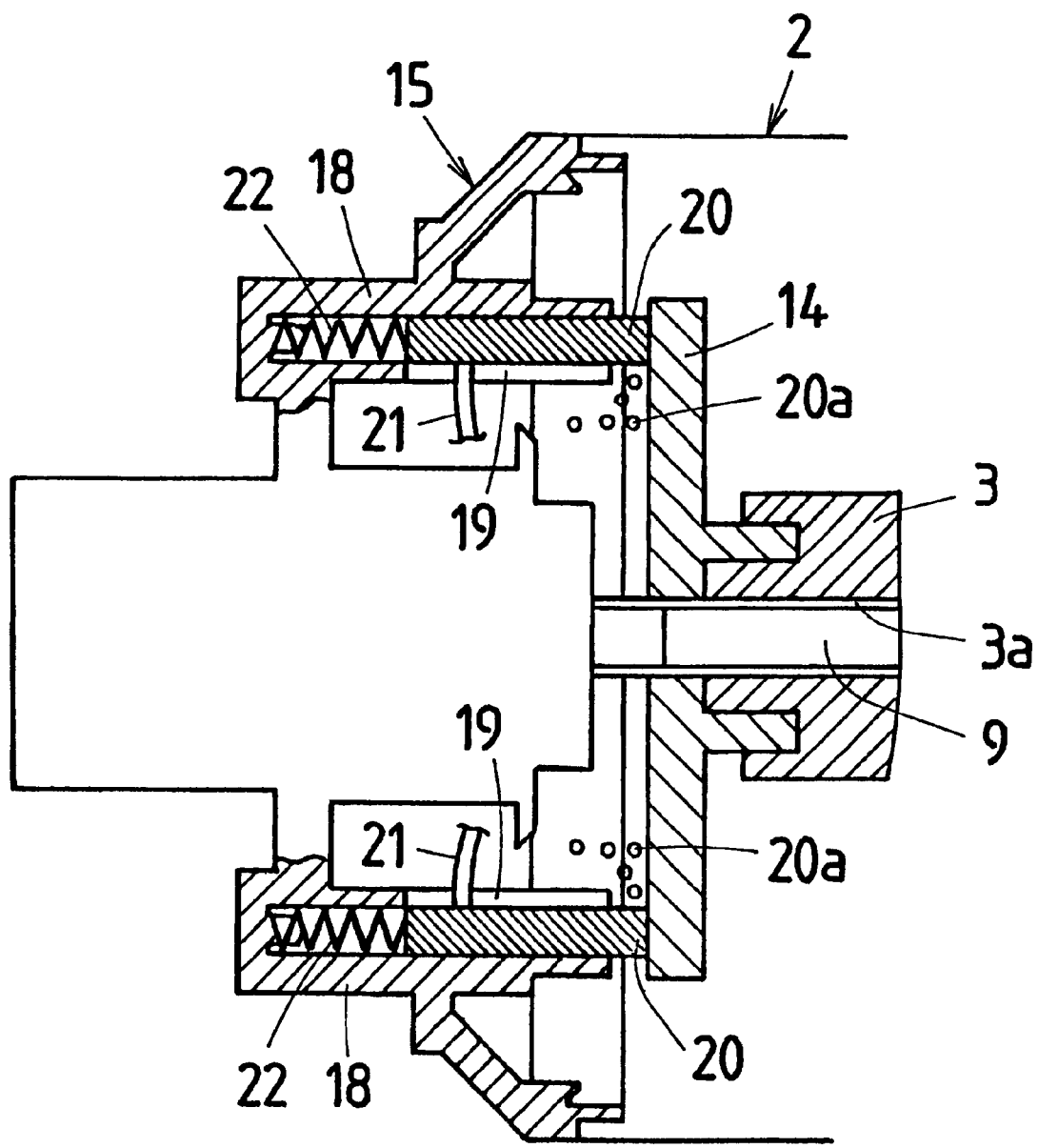
FIG. 2 is an enlarged cross sectional view of a relevant part in FIG. 1.
Figure 3:
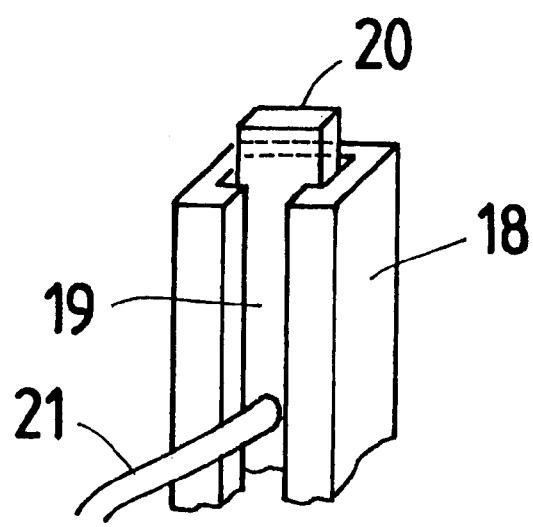
FIG. 3(a) is a perspective view to partially show a brush holding pipe portion in FIG. 2.
FIG. 3(b) is an end view of FIG. 3(a).
Figure 3:
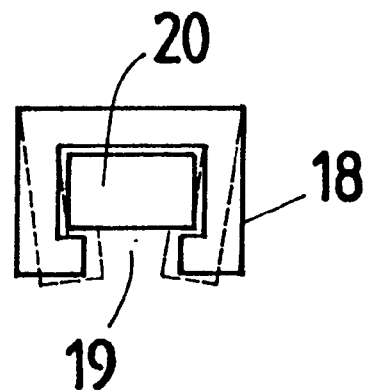
Figure 4:
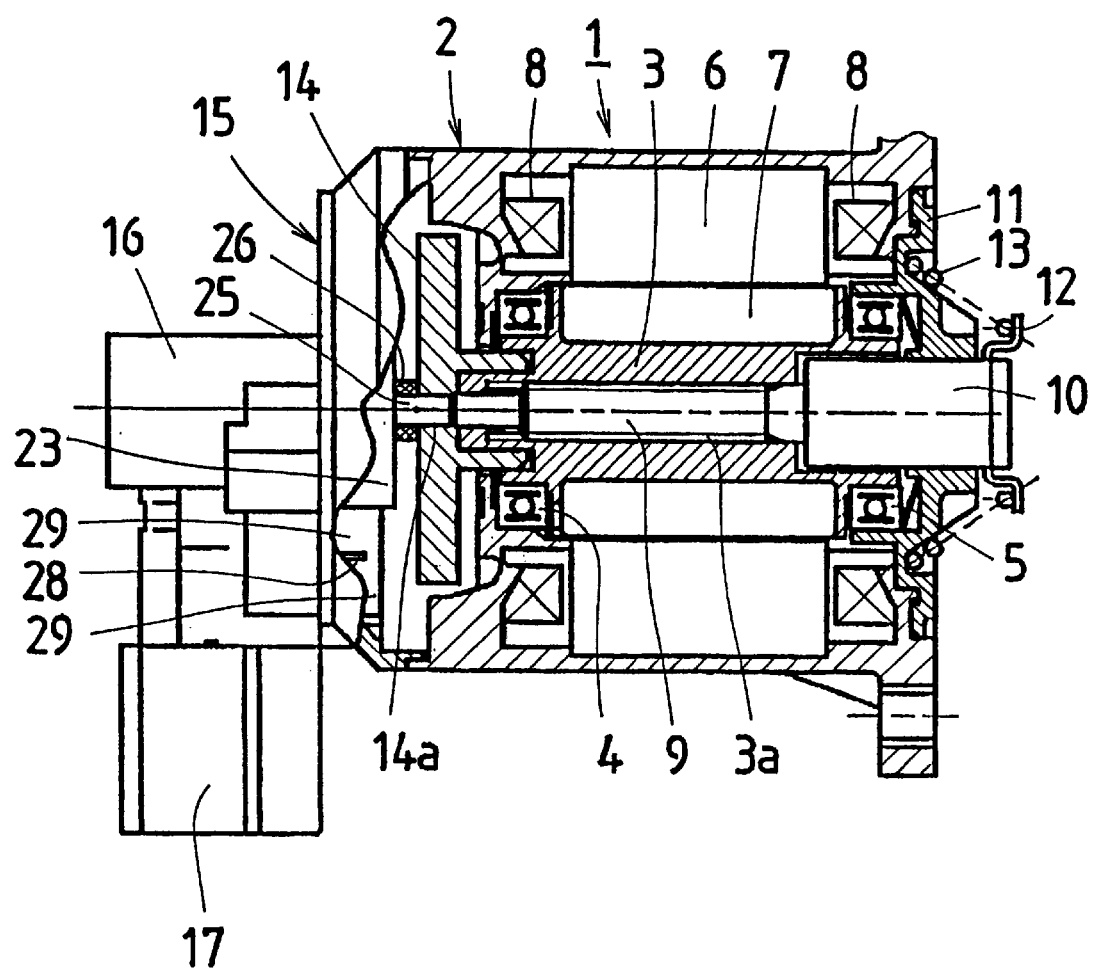
FIG. 4 is a cross sectional view to show a current passing device of an EGR valve apparatus in accordance with a preferred embodiment 1 of the present invention.
Figure 5:
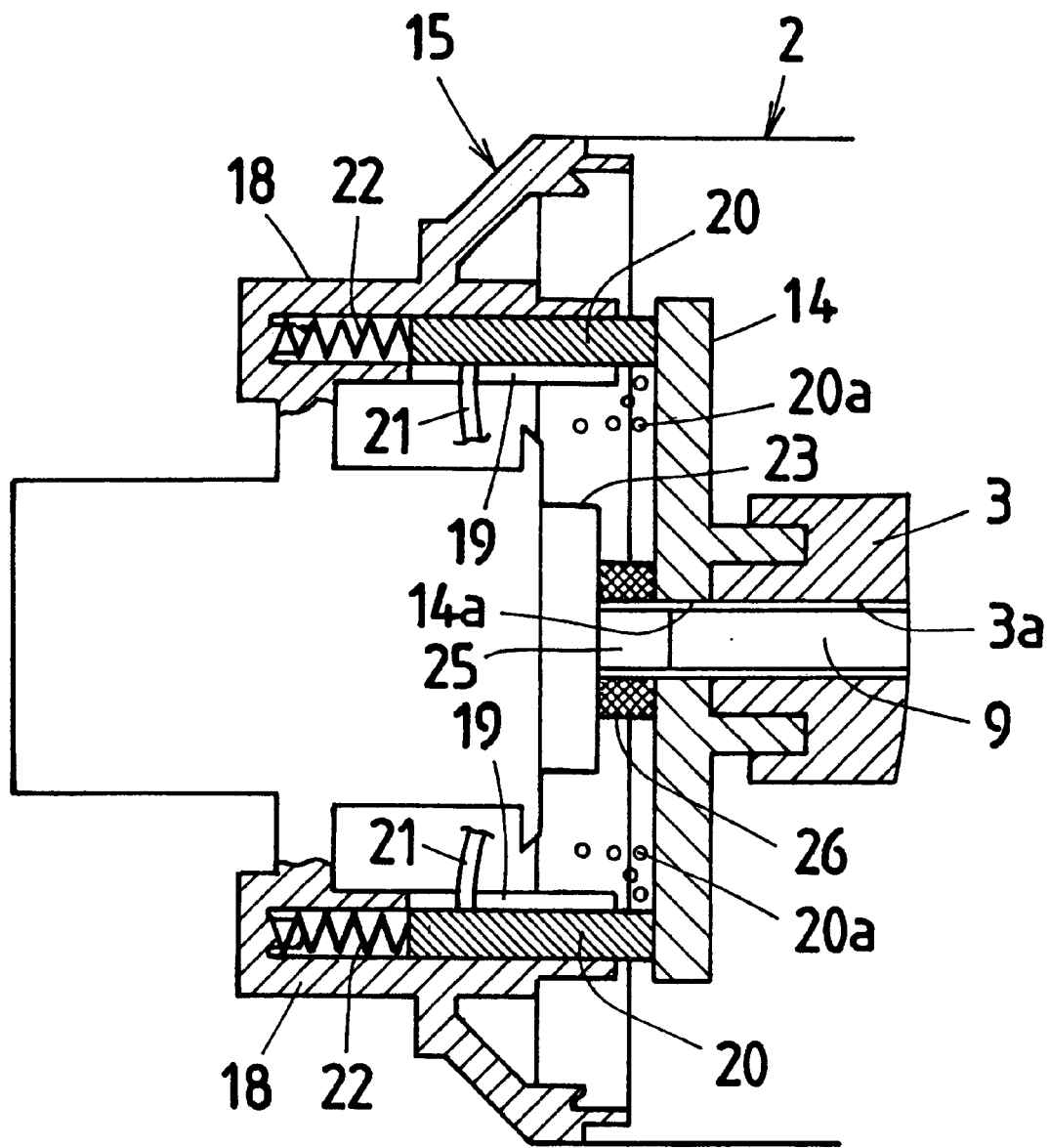
FIG. 5 is an enlarged cross sectional view of a relevant part in FIG. 4.
Figure 6:
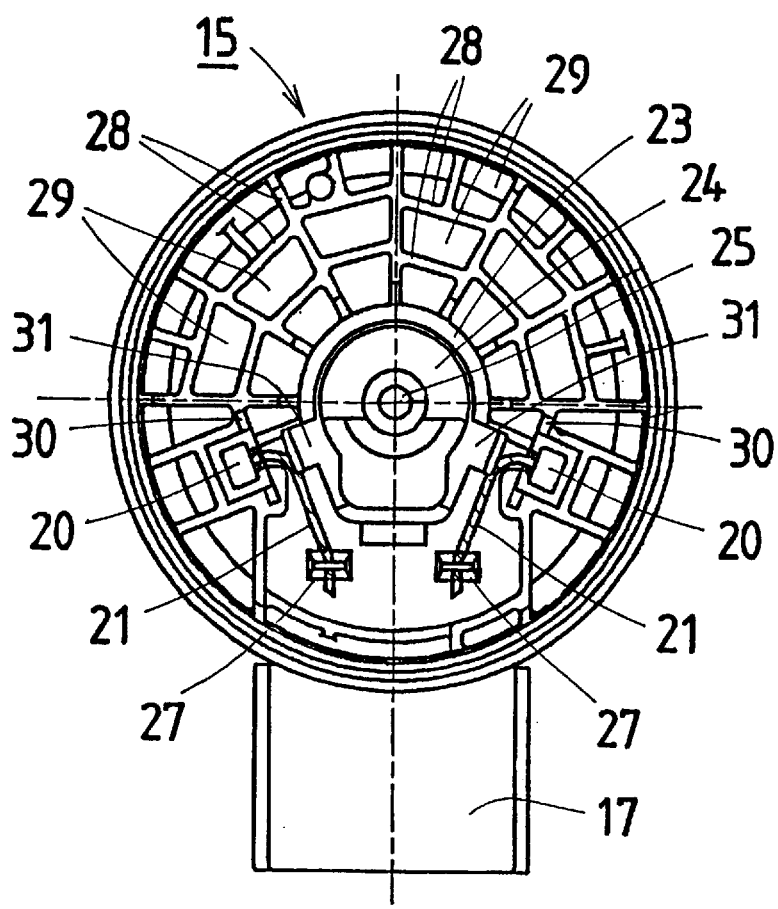
FIG. 6 is a front view of a power source side case when it is viewed from an inside thereof.
Figure 7:
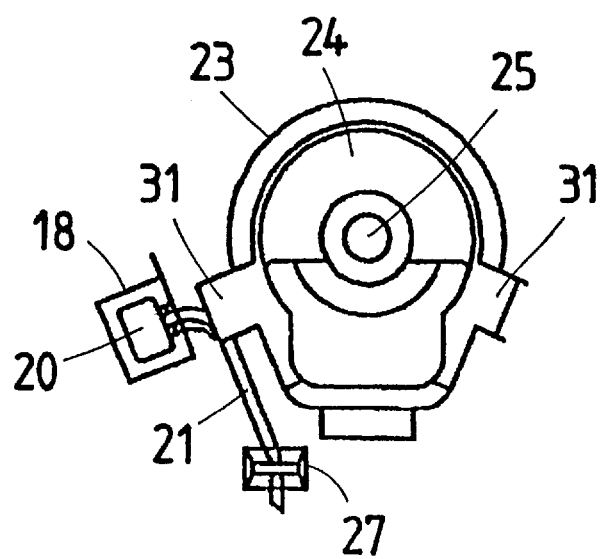
FIG. 7 is an enlarged view of a sensor portion in FIG. 6.
Figure 8:
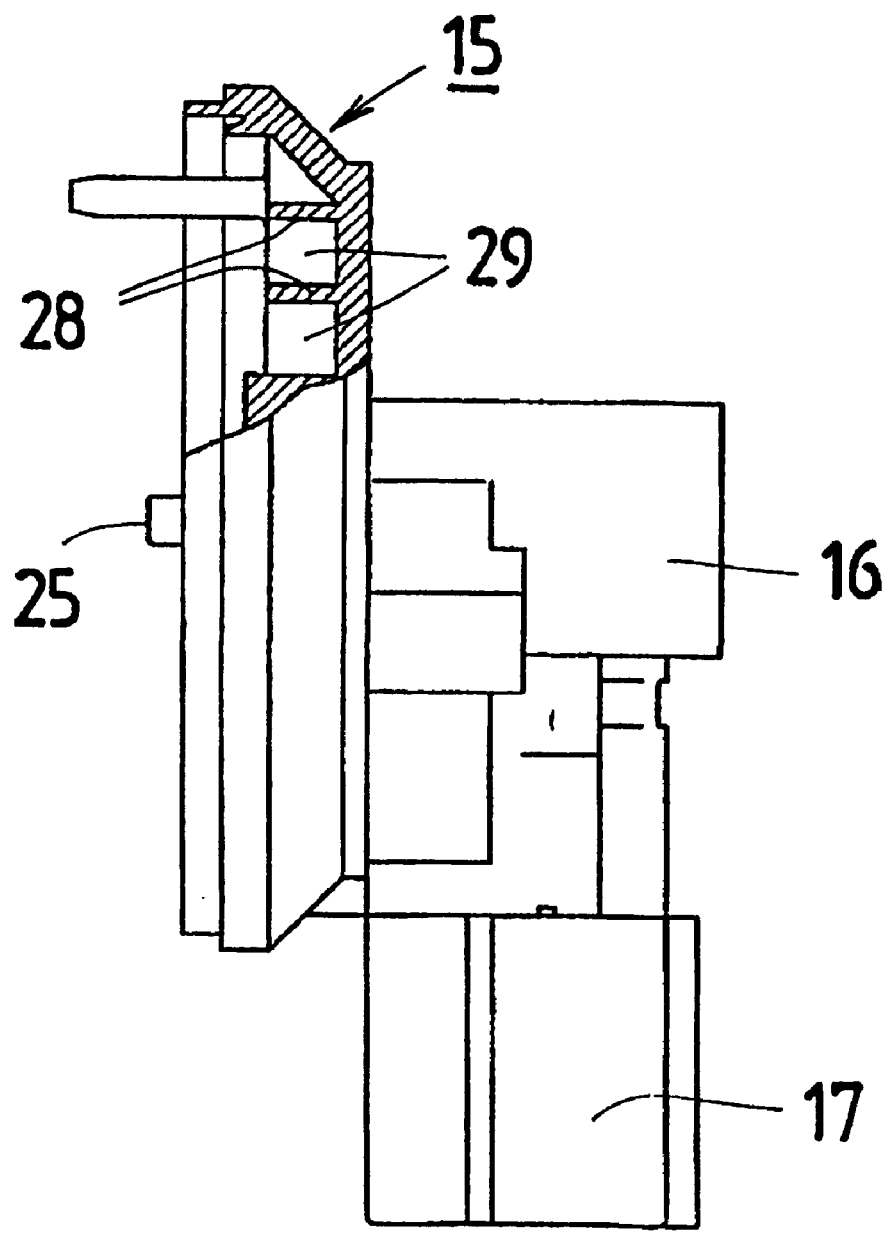
FIG. 8 is a side view partially cut away in FIG. 6.
Figure 9:
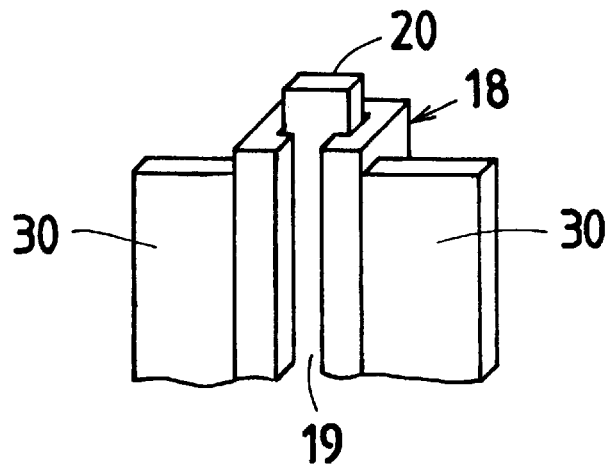
FIG. 9 is a perspective view to show a relevant part of the brush holding pipe portion in FIG. 5 and FIG. 6.

FIG. 4 is a cross sectional view to show a current passing device of an EGR valve apparatus in accordance with a preferred embodiment 1 of the present invention; FIG. 5 is an enlarged cross sectional view of a relevant part in FIG. 4; FIG. 6 is a front view of a power source side case when it is viewed from an inside thereof; FIG. 7 is an enlarged view to partially show a portion where a sensor is mounted and a brush holding pipe portion in FIG. 6; FIG. 8 is a side view partially cut away in FIG. 6; and FIG. 9 is a perspective view to show a relevant part of the brush holding pipe portion in FIG. 5 and FIG. 6. The same portions as shown in FIG. 1 to FIG. 3 are denoted by the same reference numerals and further descriptions thereof will be omitted.

In FIG. 4 to FIG. 7, a reference numeral 23 denotes an annular sensor fitting portion integrally formed in a center of the inside wall of the power source side case 15 and a reference numeral 24 denotes a sensor body (sensor portion) fitted and fixed in the sensor fitting portion 23. The sensor body 24 includes a position sensor provided with a detector 25 for detecting a degree of opening of a valve and a tip of the detector 25 faces the axial hole 14a of the commutator 14.

In FIG. 4 and FIG. 5, a reference numeral 26 denotes a filter which is fitted on the above mentioned detector 25 and is interposed between the commutator 14 and the front end face of the sensor body 24 so as to prevent the worn particles of a brush, and a small gap for allowing the rotation of the commutator 14 is set between the filter 26 and the commutator 14.

In FIG. 6 and FIG. 7, reference numerals 27 denote a plurality of power source terminals provided on the inside wall surface of the power source side case 15, and the power source terminals 27 are connected to a plurality of connector terminal (not shown) which are built in an input/output connecting portion 17, and to the power source terminal 27 are connected to the lead wire 21 of the brush 20.

A reference numeral 28 denotes a web like rib (see FIG. 6 and FIG. 8) which is integrally formed on the inside wall surface of the power source side case 15, and the rib 28 constitutes a particle trapping means for trapping the worn particles 20a of the brush 20 and a plurality of particle attracting spaces 29 are formed to lay out over the inside wall surface of the power source side case 15 by the rib 28.

In FIG. 6 and FIG. 9, reference numerals 30 denote a plurality of ribs which are provided on the brush holding pipe portion 18 so as to prevent thermal deformation and the ribs 30 are integrally formed continuously between both side walls on the side of the slit 19 of the brush holding pipe portion 18 and the above mentioned rib 28 for particle trapping.

In FIG. 6 and FIG. 7, reference numerals 31 denote a plurality of brush falling out preventing means which are provided on the above mentioned sensor body 24. The brush falling out preventing means 31, for example, includes a pressing piece portion that is integrally formed with a front end portion of a sensor casing which is a portion of a sensor component, and which is extending in the direction of the brush holding pipe portion 18 from the opening end of the sensor fitting portion 23 and engages with the lead wire 21 in the slit 19 on the tip side of the brush holding pipe portion 18. Since the pressing piece portion 31 engages with the lead wire 21 in the slit 19, the brush 20 is prevented from falling out of the brush holding pipe portion 18.

Next, mounting the brush 20 and the power source side case 15 will be described. First, while the brush 20 is inserted into the brush holding pipe portion 18 in which the spring 22 as a brush urging member is held, the lead wire 21 is slidably fitted in the slit 19 of the brush holding pipe portion 18 and then the lead wire 21 is connected to the power source terminal 27 as shown in FIG. 6 and FIG. 7. In this case, a length of the lead wire 21 between the brush 20 and the power source terminal 27 is set such that the lead wire 21 which is pulled out of the slit 19 is engaged with the pressing piece portion 31 on the side of the sensor body 24 at the tip side of the brush holding pipe portion 18. For this connection, it is also recommendable that the brush 20 is inserted into the brush holding pipe portion 18 and the lead wire 21 is connected to the power source terminal 27 and then the sensor body 24 is fitted and fixed in the sensor fitting portion 23 of the power source side case 15 to thereby engage for the lead wire 21 with the pressing piece portion 31 of the sensor body 24.

In a state where the brush 20 is inserted and set in the brush holding pipe portion 18 in the manner described above, the lead wire 21 is engaged with the pressing piece portion 31 on the side of the brush holding pipe portion 18 by the urging force of the spring 22, thereby the brush 20 is kept in a state where the brush 20 is prevented from jumping out of the brush holding pipe portion 18.

The brush 20 is made to abut on the commutator 14 in this state and then the power source side case 15 is fitted and set in the opening end portion of the motor case 2. This is the end of mounting.

Next, the operation will be described.

When the DC motor 1 is operated and the worn particles 20a (see FIG. 5) of the brush 20 which is in sliding contact with the commutator 14 rotating integrally with the rotor 3 are produced, the worn particles 20a that are apt to enter a portion where the motor shaft 9 is screwed into the rotor 3 and the inside of the sensor body 24, are trapped by the filter 26, thereby they are prevented from entering there. Further, the worn particles 20a floating near the commutator 14 and in the power source side case 15 are trapped by the surface of the web like rib 28 and the particle attracting spaces 29 in the power source side case 15. Still further, the thermal deformation of the brush holding pipe portion 18 caused by the self-heating of the brush 20 when current is passed through the brush 20 and the frictional heat produced by the friction between the commutator 14 and the brush 20 can be prevented by the ribs 30. In this connection, the other operations are performed in the same way as in the prior art, so further description will be omitted.

According to the preferred embodiment 1 described above, the particle trapping means 28 for trapping the worn particles 20a of the brush 20 is provided in the power source side case 15, so that it becomes possible to prevent the floating worn particles 20a of the brush 20 from attaching to the surface of the commutator 14, which results in producing an effect of preventing the insulating ability of the commutator 14 from being reduced by the attachment of the worn particles 20a of the brush 20.

Further, since the rib 28 is provided on the inside wall surface of the power source side case 15 as the above mentioned particle trapping means 28 to form the particle attracting spaces 29, it becomes possible to produce an effect of attracting and trapping the worn particles 20a of the brush 20 more efficiently by the surface of the above mentioned rib 28 and the particle attracting spaces 29.

Still further, since the above mentioned rib 28 is formed in the shape of a web and the plurality of particle attracting spaces 29 are formed to lay out by the ribs 28, it becomes possible to produce an effect of further improving the performance of trapping the worn particles 20a of the brush 20 and at the same time effect of increasing a strength of the power source side case 15 by the web like rib 28.

Still further, since the filter 26 to prevent the entry of the worn particles of the brush is provided between the commutator 14 and the front end face of the sensor body 24, it becomes possible to trap, by the above mentioned filter 26, the worn particles 20a of the brush 20 that are apt to enter the portion where the motor shaft 9 is screwed in the rotor 3 and the inside of the sensor body 24, it results in producing an effect of preventing the movability of the motor shaft 9 and the performance of the sensor from being reduced caused by the entry of the worn particles 20a of the brush 20.

Still further, since the ribs 30 to prevent thermal deformation are provided on both sides of the brush holding pipe portion 18, it becomes possible to prevent the brush holding pipe portion 18 from being thermally deformed in the direction that fastens tightly the brush 20 by the self-heating of the brush 20 when current is passed through the brush 20 and the frictional heat produced by the friction between the commutator 14 and the brush 20, it results in producing an effect of ensuring stable sliding ability of the brush 20.

Still further, since the ribs 30 to prevent the above mentioned thermal deformation are formed continuously and integrally with the rib 28 for trapping particles, it becomes possible to prevent the thermal deformation of the brush holding pipe portion 18 further surely and at the same time to produce an effect of forming the ribs 30 to prevent thermal deformation and the rib 28 for trapping particles integrally at a time.

Still further, the sensor body 24 is provided with the pressing piece portion 31 which engages with the lead wire 21 connected to the brush 20 inserted into the brush holding pipe portion 18 at the tip side of the above mentioned brush holding pipe portion 18 as the brush falling out preventing means to prevent the brush 20 from falling out of the brush holding pipe portion 18, so that it becomes possible to prevent the brush 20 from falling out of the brush holding pipe portion 18 by engaging the lead wire 21 pulled out of the slit 19 of the brush holding pipe portion 18 with the above mentioned pressing piece portion 31. Because of this reason, it becomes possible to prevent the brush 20 from being jumped out of the brush holding pipe portion 18 by the urging force of the spring 22 when the power source side case 15 is mounted on the motor case 2, which results in producing an effect of easily mounting the power source side case 15 and thus of improving workability in mounting the power source side case 15. Further, the pressing piece portion 31 is integrally formed with the sensor body 24 at the front end face thereof and engages with the lead wire 21 at the tip side of the brush holding pipe portion 18 as described above, so that it becomes possible to produce an effect of ensuring a sufficient sliding stroke responsive to the wear of the brush 20.

Preferred Embodiment 2

Figure 10:
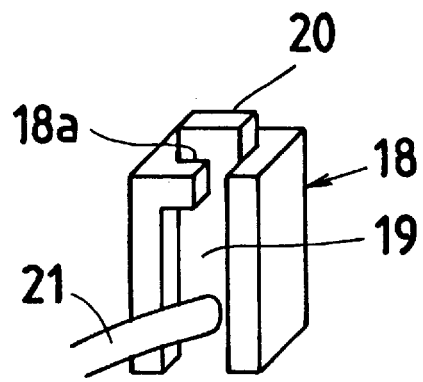
FIG. 10 is a perspective view to show a relevant part of a brush holding pipe portion in accordance with a preferred embodiment 2 of the present invention.

FIG. 10 is a perspective view to show a brush holding pipe portion in accordance with a preferred embodiment 2 of the present invention. In FIG. 10, a reference character 18a denotes a lead wire engaging protrusion that is integrally formed with the tip of the brush holding pipe portion 18 and the lead wire engaging protrusion 18a extends in a direction that blocks the slit 19 at the tip portion of the brush holding pipe portion 18. That is, while the sensor body 24 is provided with the pressing piece portion 31 as the brush falling out preventing means in the preferred embodiment 1 described above, the above mentioned lead wire engaging protrusion 18a is provided at the tip of the brush holding pipe portion 18 in the present preferred embodiment 2.

Therefore, also by the lead wire engaging protrusion 18a in accordance with the preferred embodiment 2, it becomes possible to produce the same effect as the pressing piece portion 31 in accordance with the preferred embodiment 1 described above.

Preferred Embodiment 3

Figure 11:
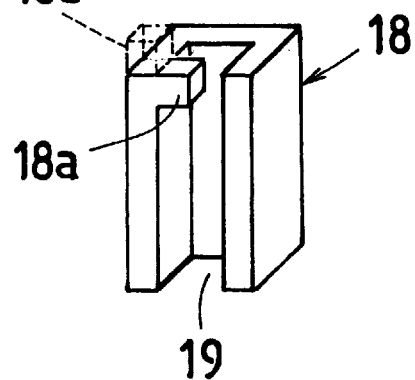
FIG. 11 is a perspective view to show a relevant part of a brush holding pipe portion in accordance with a preferred embodiment 3 of the present invention.

FIG. 11 is a perspective view to show a brush holding pipe portion in accordance with a preferred embodiment 3 of the present invention. In the preferred embodiment 3, the lead wire engaging protrusion 18a in accordance with the preferred embodiment 2 described above is constituted as follows: the lead wire engaging protrusion 18a, as shown by a dotted line in FIG. 11, is formed in such a way that it protrudes from the tip end of one side wall of the brush holding pipe portion 18 in the direction that does not block the slit 19 and the brush 20 is inserted into the brush holding pipe portion 18 and the lead wire 21 connected to the brush 20 is fitted in the slit 19 and then the above mentioned lead wire engaging protrusion 18a is bent at the position shown by a solid line in FIG. 11, thereby the lead wire 21 is engaged with the lead wire engaging protrusion 18a at the tip of the brush holding pipe portion 18.

According to this constitution, when the brush 20 is inserted into the brush holding pipe portion 18, it becomes possible to produce an effect of easily fitting the, lead wire 21 in the slit 19.

Preferred Embodiment 4

Figure 12:
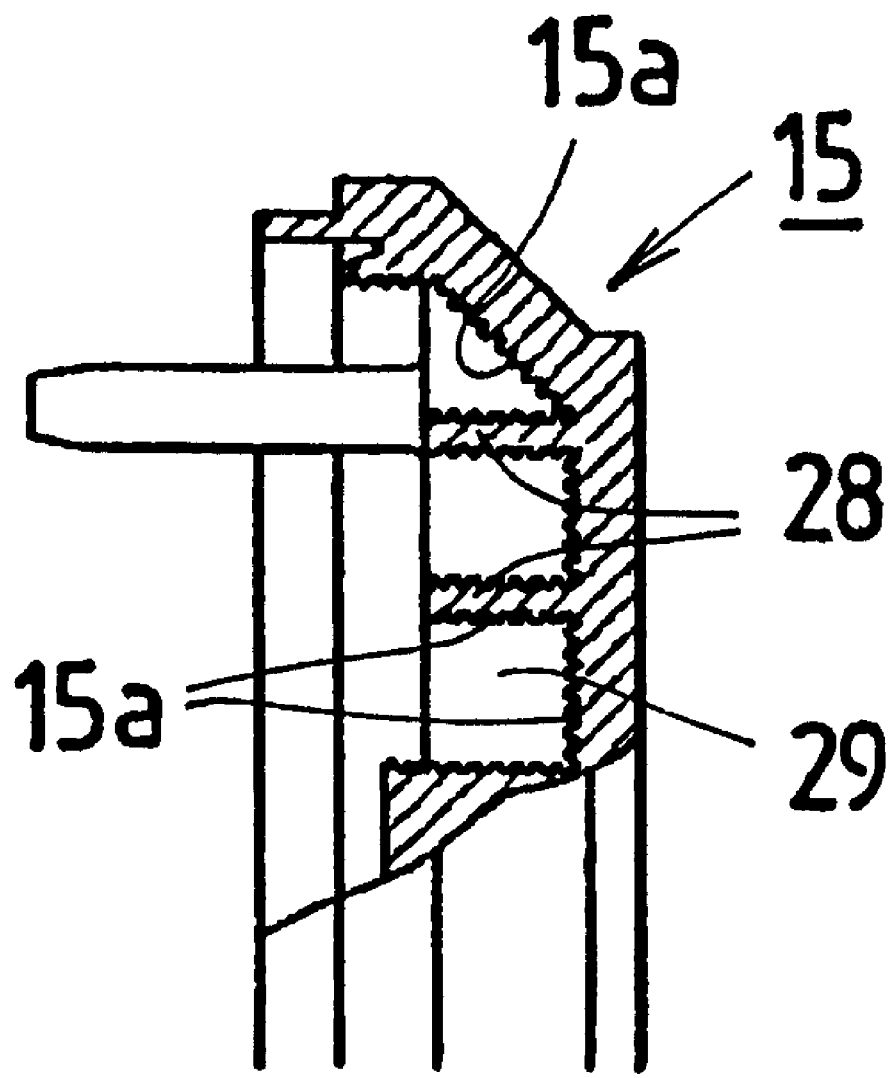
FIG. 12 is a cross sectional view to show a relevant part of a power source side case in accordance with a preferred embodiment 4 of the present invention.

FIG. 12 is a cross sectional view to show a relevant part of a power source side case in accordance with a preferred embodiment 4 of the present invention. In FIG. 12, reference characters 15a denote a plurality of serrate rough surface that is formed continuously on the top surface of the rib 28 for trapping particles and the bottom surface of the particle attracting space 29 in the power source side case 15.

As described above making the rough surface 15a of the top surface of the rib 28 for trapping particles and the bottom surface of the particle attracting space 29 of the power source side case 15, can produce an effect of further improving the performance of attracting the worn particles of the brush.

INDUSTRIAL APPLICABILITY

As described above the current passing device of the EGR valve apparatus in accordance with the present invention is appropriate for improving the reliability of an exhaust gas recirculation system for automobile use.

What is claimed is:

1. A current passing device of an EGR valve apparatus including:
    a DC motor that has a commutator rotating integrally with a rotor and drives a motor shaft in an axial direction in connection with the rotation of the rotor to thereby open and close a valve;
    a power source side case that is provided with a sensor for detecting a position of the valve and an input/output connector portion and is mounted and set in a motor case of the DC motor;
    a brush that is mounted in the power source side case and is put into sliding contact with the commutator; and
    urging means for urging the brush in a direction that presses the brush onto the commutator, characterized in that particle trapping means for trapping the worn particles of the brush is provided in the power source side case.

2. The current passing device of an EGR valve apparatus as claimed in claim 1, wherein the particle trapping means includes a particle attracting space formed by a rib for trapping particles that is provided in the power source side case.

3. The current passing device of an EGR valve apparatus as claimed in claim 2, wherein the rib is formed in the shape of a web on the inside wall surface of the power source side case to form a plurality of particle attracting spaces.

4. The current passing device of an EGR valve apparatus as claimed in claim 2, wherein the surface of the rib and the bottom surface of the particle attracting space are made rough.

5. A current passing device of an EGR valve apparatus including:
    a DC motor that has a commutator rotating integrally with a rotor and drives a motor shaft in an axial direction in connection with the rotation of the rotor to thereby open and close a valve;
    a power source side case that is provided with a sensor for detecting a position of the valve and an input/output connector portion and is mounted and set in a motor case of the DC motor;

a brush holding pipe portion that is mounted on the power source side case;

a brush that is slidably inserted into the brush holding pipe portion and is put into sliding contact with the commutator; and urging means that is built in the brush holding pipe portion for urging the brush in a direction that presses the brush onto the commutator, characterized in that rib to prevent thermal deformation is provided on the brush holding pipe portion.

6. The current passing device of an EGR valve apparatus as claimed in claim 5, wherein the rib to prevent thermal deformation is formed continuously integrally with a rib for trapping particles that is provided in the power source side case to form a particle attracting space.

7. A current passing device of an EGR valve apparatus including:

a DC motor that has a commutator rotating integrally with a rotor and drives a motor shaft in an axial direction in connection with the rotation of the rotor to thereby open and close a valve;

a power source side case that is provided with a sensor for detecting a position of the valve and an input/output connector portion and is mounted and set in a motor case of the DC motor;

a brush holding pipe portion that is mounted on the power source side case;

a brush that is slidably inserted into the brush holding pipe portion and is put into sliding contact with the commutator; and urging means that is built in the brush holding pipe portion for urging the brush in a direction that presses the brush onto the commutator, characterized in that there is provided a brush falling out preventing means to prevent the brush from falling out of the brush holding pipe portion.

8. The current passing device of an EGR valve apparatus as claimed in claim 7, wherein the brush falling out preventing means is formed of a pressing piece portion that is formed on a portion of the sensor component and presses a lead wire connected to the brush on a tip side of the brush holding pipe portion.

9. The current passing device of an EGR valve apparatus as claimed in claim 7, wherein the brush falling out preventing means is formed of a lead wire engaging protrusion that is formed on a tip of the brush holding pipe portion having a slit in which a lead wire connected to the brush is fitted, and that extends in a direction that blocks the slit.

10. The current passing device of an EGR valve apparatus as claimed in claim 9, wherein the lead wire engaging protrusion is formed by fitting the lead wire in the slit of the brush holding pipe portion and then bending a portion of the tip of the brush holding pipe portion.

11. A current passing device of an EGR valve apparatus including:

a DC motor that has a commutator rotating integrally with a rotor and drives a motor shaft in an axial direction in connection with the rotation of the rotor to thereby open and close a valve;

a power source side case that is provided with a sensor for detecting a position of the valve and an input/output connector portion and is mounted and set in a motor case of the DC motor;

a brush that is mounted in the power source side case and is put into sliding contact with the commutator; and urging means for urging the brush in a direction that presses the brush onto the commutator, characterized in that a filter to prevent entry of worn particles of the brush is disposed between the commutator and a front end face of the sensor portion mounted on the power source side case.

* * * * *